United States Patent Office 2,852,528
Patented Sept. 16, 1958

2,852,528

HETEROCYCLIC COMPOUNDS AND METHOD FOR PRODUCING SAME

Karl Hoffmann and Ernst Urech, Binningen, Switzerland, assignors to Ciba Pharmaceutical Products Inc., Summit, N. J.

No Drawing. Application May 22, 1957
Serial No. 660,743

Claims priority, application Switzerland March 3, 1954

6 Claims. (Cl. 260—327)

This is a continuation-in-part of our copending application, Serial No. 489,306, filed February 18, 1955 now abandoned.

This invention relates to 11-unsubstituted 10-(tertiary aminoalkyl) - dibenzo - [b:f] - thia - [1] - aza - [4] - cycloheptadiene-[2:6]-compounds having the general formula

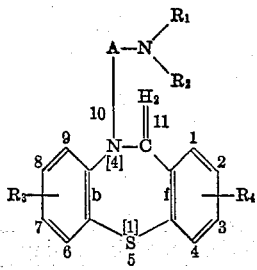

and salts, such as acid addition salts or quaternary ammonium salts thereof. A in the above general formula represents a lower alkylene radical and $R_1$ and $R_2$ represent, interchangeably, lower alkyl or cycloalkyl radicals, and when taken together, lower alkylene or lower monooxaalkylene radicals, preferably those containing 4 to 5 carbon atoms. The positions 1 to 4 and 6 to 9 may be unsubstituted or substituted, that is to say, $R_3$ and $R_4$ may represent, interchangeably, hydrogen, halogen, i. e. chloro, bromo, fluoro or iodo; amino; lower alkyl and lower alkoxy groups.

The tertiary aminoalkyl radical, of which the alkylene chain may be straight or branched, is preferably a tertiary amino lower alkyl radical. The tertiary amino group is more especially an amino group disubstituted by alkyl, e. g. lower alkyl and/or cycloalkyl radicals or an amino group disubstituted by an alkylene radical which may, if desired, be interrupted by a hetero atom such as oxygen. Such aminoalkyl radicals are, for example, dimethylamino-, diethylamino-, pyrrolidino-, piperidino-, or morpholino-ethyl, -propyl, -isopropyl, -butyl, -isobutyl or -pentyl groups.

As quaternary ammonium salts there may be mentioned, more especially, lower alkyl ammonium salts, for example, lower alkyl ammonium halides, e. g. methyl, ethyl, propyl and butyl ammonium chlorides.

The new basically substituted heterocyclic compounds which comprise the invention possess an antihistaminic effect and are useful as antihistamines. They can be administered in any suitable manner, for example orally, in combination with an adjuvant as a carrier to facilitate the administration thereof.

The new compounds are prepared by reducing the oxo-groups in a 10-(tertiary-aminoalkyl)-11-oxo-dibenzo- [b:f] - thia - [1] - aza - [4] - cycloheptadiene - [2:6]-compound with a reducing agent, the tertiary aminoalkyl radical being the same as hereinabove described. The reduction of the oxo group is carried out, for example, with a complex metal hydride, such as lithium aluminum hydride, or catalytically with hydrogen, in the presence of a copper chromite catalyst, or electrolytically. Depending on the conditions used the reduction may be interrupted at the stage of the carbinol and the latter isolated.

Preparation of quaternary ammonium salts of a free base so obtained is carried out, for example, by reaction with an alkyl halide, dialkyl sulfate or sulfonic acid alkyl ester.

Depending on the conditions used the new compounds are obtained in the form of their bases, acid addition salts, or quaternary ammonium salts. From the salts there can be obtained in the usual manner the free amines or ammonium bases. From the amines or ammonium bases salts can be obtained by reaction with acids which are suitable for the formation of therapeutically useful or non-toxic salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or therapeutically active acids.

The starting materials, namely, the 10-(tertiary-aminoalkyl) - 11 - oxo - dibenzo - [b:f] - thia - [1] - aza - [4]-cycloheptadiene-[2:6] compounds are new. In general, they can be prepared by reacting an 11-oxo-dibenzo-[b:f]-thia-[1]-aza-[4]-cycloheptadiene-[2:6] which is unsubstituted in the 10-position with a reactive ester of a tertiary-aminoalkanol, e. g., a tertiary-aminoalkyl halide. The novel starting materials and the method for preparing them are described and claimed in our application Serial No. 489,305, filed on February 18, 1955.

The 11-oxo-dibenzo-[b:f]-thia-[1]-aza-[4]-cycloheptadiene-[2:6] compounds, in turn, are prepared by intramolecularly condensing by heating in the absence of an acid condensating agent, N-unsubstituted 2-amino-diphenyl-sulfide-2'-carboxylic acids or lower alkanol esters thereof.

The new compounds are useful as medicaments, for example in the form of pharmaceutical preparations, which contain the new compounds or salts thereof in admixture with a pharmaceutical organic or inorganic solid or liquid carrier suitable for enteral, parenteral or topical administration. For making up the preparations there can be employed substances which do not react with the new compounds, such for example, as water, gelatine, lactose, starches, magnesium stearate, talc, vegetable oils, benzyl alcohols, gums, polyalkylene glycols, petroleum, cholesterol or any other known carrier for medicaments. The pharmaceutical preparations may be, for example, in the form of tablets, dragees, salves, creams or in liquid form as solutions, suspensions or emulsions. If desired, they may be sterilized and/or contain auxiliary substances, such as preserving agents, stabilizing agents, wetting or emulsifying agents, salts for varying the osmotic pressure or buffers. They may also contain other therapeutically useful substances.

The following examples illustrate the invention, the parts being by weight unless otherwise stated and the relationship of parts by weight to parts by volume being the same as that of the gram to the cubic centimeter:

Example 1

In a flask fitted with stirring mechanism with an extraction device and with a reflux condenser 11.4 parts of lithium aluminum hydride in 1000 parts by volume of absolute ether are heated at the boil so that the refluxing ether dissolves out in the course of 2–3 hours 29.8 parts of 10-($\beta$-dimethylamino-ethyl) - 11 - oxo-dibenzo - [b:f] - thia - [1] - aza-[4]-cycloheptadiene-[2:6] which is in the extraction device. After being heated for a further 3 hours, the reaction mixture is cooled in ice, mixed with a small quantity of water, and then filtered with suction. After being dried over potassium carbonate, the ethereal solution is evaporated and the residue is recrystallized from a small amount of hexane. There is obtained in very good yield 10-(β-dimethylamino - ethyl) - dibenzo - [b:f] - thia - [1] - aza - [4]- cyclo-heptadiene-[2:6] of the formula

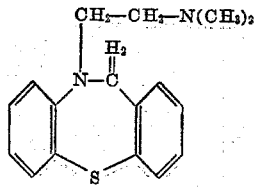

in the form of colorless crystals melting at 58° C., which are soluble in the usual organic solvents. The hydrochloride, which is prepared from the mixture of alcohol and ethyl acetate, by adding alcoholic hydrochloric acid melts at 209–210° C.

In a similar manner there can be prepared other salts, such as the hydrobromide, sulfate, phosphate, oxalate, toluene sulfonate and the like.

In carrying out the reaction the aforesaid oxo-compound may also be added in portions to the solution of lithium-aluminum hydride.

*Example 2*

A solution of 3.0 parts of lithium aluminum hydride in 200 parts by volume of absolute ether is mixed at 25–35° C. in the course of 30 minutes with a solution of 13.2 parts of 10-(β-diethylamino-ethyl)-11-oxo-dibenzo - [b:f] - thia - [1] - aza - [4] - cycloheptadiene-[2:6] in 50 parts by volume of ether, and the mixture is maintained at the boil for a further 4 hours. The whole is cooled with ice, a small quantity of water is added, and the ethereal solution is filtered with suction. After drying the solution over potassium carbonate, the ether is distilled off and the residue is distilled in a high vacuum. There is obtained in good yield 10-(β-diethyl-amino - ethyl) - dibenzo - [b:f] - thia - [1] - aza - [4]- cycloheptadiene-[2:6] of the formula

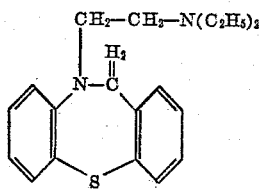

in the form of a pale yellow oil boiling at 152–158° C. under 0.18 mm. pressure. It is easily soluble in the usual organic solvents. Its methane sulfonate, which is prepared by the addition of methane sulfonic acid in ethyl acetate, melts at 139–141° C. It is easily soluble in water, whereas the neutral oxalate prepared by adding oxalic acid in alcohol, melting at 159–161° C. is only slightly soluble therein.

*Example 3*

6.4 parts of lithium aluminum hydride, dissolved in 350 parts by volume of absolute ether, are mixed in the course of 50 minutes at 25–30° C. with a solution of 29.0 parts of 10-(γ-diethylamino-propyl)-11-oxo-dibenzo- [b:f] - thia - [1] - aza - [4] - cycloheptadiene - [2:6] in 150 parts by volume of ether, and the whole is heated at the boil for 4 hours. After cooling the mixture with ice, a small quantity of water is added, the ethereal solution is filtered with suction, dried over potassium carbonate and the ether is evaporated. The residue oil is distilled, whereby 10-(γ - diethylamino - propyl)-dibenzo- [b:f]-thia-[1]-aza-[4]-cycloheptadiene - [2:6] of the formula

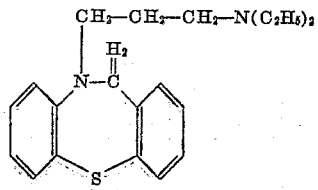

is obtained in the form of a pale yellow oil boiling at 178–182° C. at 0.2 mm. pressure. The hydrochloride, which is prepared by the addition of hydrochloric acid in ethyl acetate, melts at 109–111° C.

*Example 4*

The procedure is the same as that described in Example 3, except that the 10-(γ-diethylamino-propyl)-11- oxo - dibenzo - [b:f] - thia - [1] - aza - [4] - cycloheptadiene-[2:6], is replaced by 28.6 parts of 10-(γ-pyrrolidino-propyl) - 11 - oxo - dibenzo-[b:f]-thia-[1]-aza- [4]-cycloheptadiene-[2:6], and there is obtained 10-(γ-pyrrolidino - propyl) - dibenzo - [b:f] - thia - [1] - aza- [4]-cycloheptadiene-[2:6] of the formula

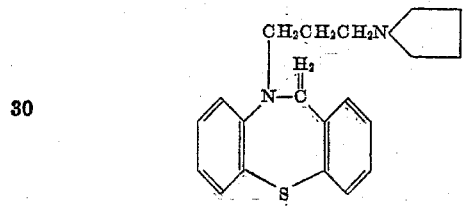

which, when recrystallized from hexane or isopropyl ether, yields colorless crystals melting at 38° C. The hydrochloride prepared as described in Example 3 melts at 162–164° C. It dissolves easily in water.

*Example 5*

By working in the manner described in Example 1, there is obtained from 31.2 parts of 10-(β-dimethylamino- β - methyl - ethyl) - 11 - oxo - dibenzo - [b:f] - thia- [1]-aza-[4]-cycloheptadiene-[2:6] melting at 110–112° C., 10-(β-dimethylamino - β - methyl - ethyl) - dibenzo- [b:f] - thia - [1] - aza - [4] - cycloheptadiene - [2:6] of the formula

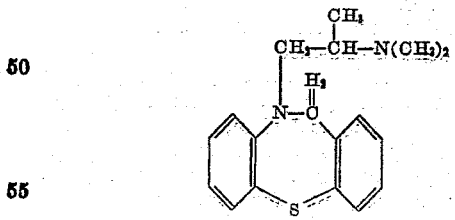

in the form of a pale yellow oil boiling at 178–185° C. under 0.3 mm. pressure. Its hydrochloride prepared as described in Example 3 melts at 180–182° C.

*Example 6*

A solution of 5.6 parts of lithium aluminum hydride in 375 parts by volume of absolute ether is mixed at 25–30° C. in the course of 50 minutes with a solution of 26.0 parts of 8-chloro-10-(γ-dimethylamino-propyl)-11- oxo-dibenzo - [b:f] - thia - [1] - aza - [4] - cycloheptadiene-[2:6] in 100 parts by volume of ether and 50 parts by volume of tetrahydrofurane, and the reaction mass is heated at the boil for a further 4 hours. It is then cooled in ice, a small amount of water is added, and the mixture is filtered with suction, the filter residue is washed well with ether, and the combined solutions are evaporated to dryness. The residue is crystallized from a mixture of pentane and isopropyl ether (1:1), and a fraction I melting at 75–77° C. is obtained. After concentrating the mother liquor there is obtained a fraction II melting at 46–48° C.

Fraction I is 8-chloro-10-(γ-dimethylamino-propyl)-11-hydroxy - dibenzo - [b:f] - thia - [1] - aza - [4] - cycloheptadiene-[2:6] of the formula

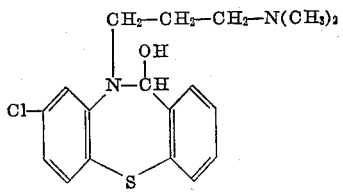

There can be obtained therefrom according to the directions given in Example 3 a hydrochloride melting at 189–191° C.

Fraction II is a free from oxygen and is 8-chloro-10-(γ-dimethylamino-propyl) - dibenzo - [b:f] - thia - [1]-aza-[4]-cycloheptadiene-[2:6] of the formula

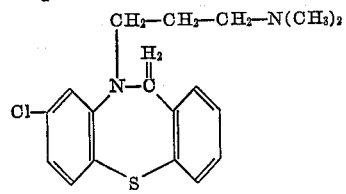

Its hydrochloride prepared as described in Example 3 melts at 135–137° C.

Example 7

A solution of 18.8 parts of 8-chloro-10-(γ-diethylamino-propyl) - 11 - oxo - dibenzo - [b:f] - thia - [1] - aza-[4]-cycloheptadiene-[2:6] in 100 parts by volume of absolute ether is run in the course of 75 minutes into a boiling solution of 5.7 parts of lithium aluminum hydride in 450 parts by volume of absolute ether, and the mixture is boiled for 5 hours under reflux. The mixture is cooled with ice, a small quantity of water is added thereto, and the ether is filtered off with suction. The ethereal solution is dried with potassium carbonate and evaporated to dryness. The resulting oil is crystallized from a small amount of hexane or isopropyl ether, and yields 8-chloro - 10 - (γ - diethylamino-propyl)-dibenzo-[b:f] - thia - [1] - aza - [4] - cycloheptadiene - [2:6] of the formula

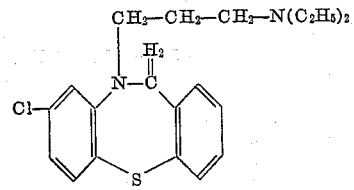

in the form of colorless crystals melting at 37–38° C.

In an analogous manner there are obtained from the corresponding 11-oxo-compounds:

Example 8

7-chloro - 10 - (β - diethylamino-ethyl)-dibenzo-[b:f]-thia - [1] - aza - [4] - cycloheptadiene - [2:6] boiling at 178–188° C. under 0.17 mm. pressure of mercury. Its methane sulfonate prepared as described in Example 2 melts at 134–138° C.

Example 9

7-chloro - 10 - (γ - dimethylamino-propyl)-dibenzo-[b:f] - thia - [1] - aza - [4] -cycloheptadiene - [2:6] boiling at 180–190° C. under 0.19 mm. pressure of mercury. Its hydrochloride prepared as described in Example 3 melts at 160–162° C.

Example 10

6 - chloro - 10 - (γ - dimethylamino-propyl)-dibenzo-[b:f]-thia[1]-aza-[4]-cycloheptadiene-[2:6] boiling at 175–184° C. under 0.17 mm. pressure of mercury. Its hydrochloride prepared as described in Example 3 melts at 135–137° C.

The starting materials used in the examples given hereinbefore are prepared as follows:

Example A 22.7 parts of 11 - oxo - dibenzo - [b:f]- thia - [1]-aza-[4] - cycloheptadiene - [2:6] and 5 parts of sodamide are heated with 250 parts by volume of dioxane for 90 minutes at the boil, during which ammonia is evolved. A solution of 13 parts of β-dimethylamino-ethyl chloride in dioxane is then added in the course of one hour at the boil, and the mixture is boiled for a further 2 hours. After the reaction, the excess of sodamide is decomposed by the addition of a small amount of alcohol. The reaction mass is then filtered with suction, the filtrate evaporated to dryness and the residue is recrystallized from ethyl acetate. In this manner there is obtained 10-(β-dimethylamino-ethyl) - 11 - oxo - dibenzo - [b:f] - thia - [1] - aza - [4] - cycloheptadiene - [2:6] of the formula

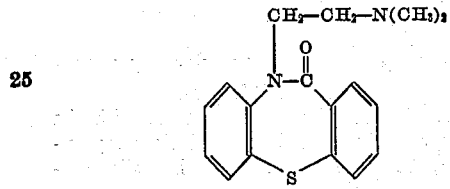

in the form of colorless crystals melting at 139–140° C. The colorless hydrochloride obtained in the manner described in Example B melts at 232–235° C. and is easily soluble in water.

In the above reaction the dioxane may be replaced by another inert solvent such as benzene, toluene or xylene.

Example B 22.7 parts of 11 - oxo - dibenzo - [b:f] - thia - [1]-aza-[4] - cycloheptadiene - [2:6] and 5 parts of sodamide are heated in 400 parts by volume of xylene at the boil until the evolution of ammonia ceases. A solution of 20 parts of β-diethylamino-ethyl chloride in xylene is run in, in the course of 2 hours, and the whole is heated for a further 2 hours at 120–135° C. After being cooled to about 80° C., the reaction mass is then filtered with suction and the xylene is distilled off in vacuo. The residue is dissolved in dilute hydrochloric acid, the solution is extracted with ether, and the aqueous solution is mixed with alkali. The base which separates is dissolved in ether, the ethereal solution is dried over potassium carbonate and evaporated. By distillation there is obtained in good yield a fraction boiling at 165–170° C. under 0.18 mm. pressure in the form of a pale yellow oil. It is 10-(β-diethylamino-ethyl) - 11 - oxo - dibenzo - [b:f] - thia - [1]-aza-[4]-cycloheptadiene-[2:6] of the formula

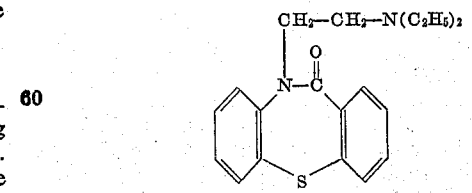

A solution of the base in ethyl acetate yields on the addition of the calculated quantity of alcoholic hydrochloric acid the colorless hydrochloride melting at 168–170° C. It is easily soluble in water.

Example C 22.7 parts of 11 - oxo - dibenzo - [b:f] - thia - [1] - aza-[4]-cycloheptadiene-[2:6] and 5 parts of sodamide are heated with 250 parts by volume of dioxane for 90 minutes at the boil. There is then added in the course of one hour a solution of 18.7 parts of γ-diethylamino-propyl chloride in dioxane at the boiling temperature and boiled for a further 2 hours. The excess of sodamide is then decomposed with a small amount of alcohol, the reaction mixture is filtered with suction and the filtrate is evaporated to dryness. The residue is dissolved in dilute hydrochloric acid, a small amount of neutral substances is extracted from this solution with ether, and the base so obtained is precipitated from the acid solution by means of alkali. This base is taken up in ether and the ether is distilled off, after drying the solution over potassium carbonate. The residual oil is distilled in a high vacuum, whereby 10 - (γ - diethylamino - propyl) - 11 - oxo - dibenzo - [b:f] - thia - [1] - aza - [4] - cycloheptadiene-[2:6] of the formula

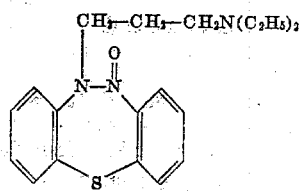

passes over in the form of a yellowish thick oil boiling at 182–188° C. under a pressure of 0.18 mm.

The hydrochloride obtained in ethyl acetate with the aid of alcoholic hydrochloric acid is a colorless crystalline powder melting at 148–150° C., which is easily soluble in water.

*Example D*

In the procedure described in Example A there is used, instead of β-dimethylamino-ethyl chloride, 18.2 parts of γ-pyrrolidino-propyl chloride. After working up the dioxane solution as described in Example A, there is obtained a crude base which is recrystallized from three times the quantity of isopropyl ether to yield pure 10-(γ - pyrrolidino - propyl) - 11 - oxo - dibenzo - [b:f] - thia - [1] - aza - [4] - cycloheptadiene - [2:6] of the formula

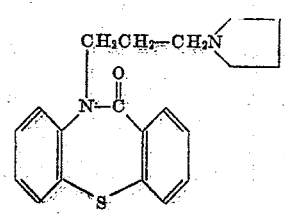

in the form of colorless crystals melting at 76–78° C.

The hydrochloride prepared as described in Example B, is recrystallized from a mixture of ethyl acetate and alcohol. It melts at 197–198° C. It is easily soluble in water.

*Example E*

56.7 parts of 11-oxo-dibenzo-[b:f]-thia-[1]-aza-[4]-cycloheptadiene-[2:6] are heated at the boil with 12.5 parts of sodamide in 550 parts of dioxane until the evolution of ammonia ceases. The dioxane solution of 38.0 parts of β-dimethylamino-α-methyl-ethyl chloride is introduced dropwise in the course of 90 minutes, and then the whole is heated at the boil for a further 2 hours. When the reaction has ceased, a small amount of methanol is added and the warm reaction mass is filtered with suction. The filtrate is evaporated to dryness and the evaporation residue is crystallized from 3 parts by volume of hexane, whereby 63 parts of a crystallizate melting at 106–110° C. are obtained. Further recrystallization of this fraction raises the melting point to 110–112° C. It is 10-(β-dimethylamino-β-methyl-ethyl)-11-oxo - dibenzo - [b:f] - thia - [1] - aza - [4] - cycloheptadiene-[2:6] of the Formula I. A further fraction having a lower melting point is 10-(β-dimethylamino-α-methyl - ethyl) - 11 - oxo - dibenzo - [b:f] - thia - [1]-aza-[4]-cycloheptadiene-[2:6] of the Formula II

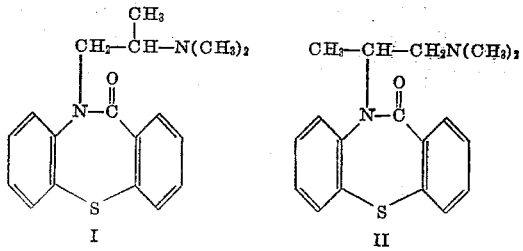

The hydrochloride of the Base I prepared as described in Example A when recrystallized from isopropanol melts at 150–152° C. It is easily soluble in water.

*Example F*

8 - chloro - 10 - (γ - dimethylamino - propyl) - 11-oxo - dibenzo - [b:f] - thia - [1] - aza - [4] - cycloheptadiene-[2:6] of the formula

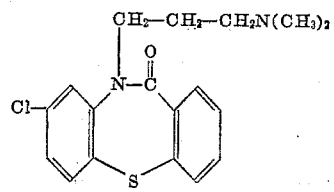

is obtained in the form of colorless crystals melting at 111–137° C. (recrystallized from isopropyl ether) by the procedure described in Example A, but using 39.3 parts of 8-chloro-11-oxo-dibenzo-[b:f]-thia-[1]-aza-[4]-cycloheptadiene-[2:6], 7.5 parts of sodamide, 375 parts by volume of dioxane and 23.8 parts of γ-dimethylamino-propyl-chloride.

The hydrochloride is prepared from the base by neutralizing a solution in ethyl acetate with the calculated quantity of alcoholic hydrochloric acid. It melts at 172–174° C. and dissolves well in water.

*Example G*

8 - chloro - 10 - (γ - diethylamino - propyl) - 11 - oxo-dibenzo - [b:f] - thia - [1] - aza - [4] - cycloheptadiene-[2:6] melting at 51–53° C. is prepared as described in Example 6 by using, instead of β-dimethylamino-ethyl chloride, 28.0 parts of γ-diethylamino-propylchloride. The base can be recrystallized from hexane. It has the following formula

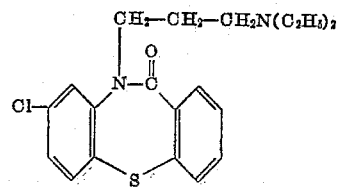

The hydrochloride is obtained by neutralizing a solution of the base in isopropanol with the calculated quantity of alcoholic hydrochloric acid. It melts at 186–188° C.

*Example H*

39.3 parts of 7-chloro-11-oxo-dibenzo-[b:f]-thia-[1]-aza-[4]-cycloheptadiene-[2:6], 7.5 parts of sodamide and 26.4 parts of diethylamino-ethyl chloride in dioxane are reacted in the manner described in Example F. There is obtained 7-chloro-10-(β-diethylamino-ethyl)-11-oxo-dibenzo-[b:f]-thia-[1]-aza-[4]-cycloheptadiene-[2:6] of the formula

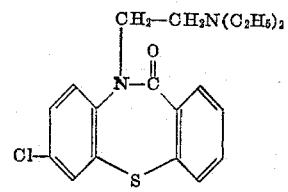

as a thick oil boiling at 190–193° C. under 0.17 mm. pressure of mercury. With dilute hydrochloric acid the somewhat difficultly soluble hydrochloride melting at 232–235° C. with decomposition is obtained. The methane sulfonate, which is prepared in ethylacetate-ether, melts at 95–98° C. It is easily soluble in water.

*Example I*

Following the method used in Example F there is obtained from 39.3 parts of 7-chloro-11-oxo-dibenzo-[b:f]-thia-[1]-aza-[4]-cycloheptadiene-[2:6], 7.5 parts sodamide and 23.8 parts of γ-dimethylamino-n-propyl chloride in dioxane the 7-chloro-10-(γ-dimethylaminopropyl) - 11 - oxo - dibenzo - [b:f] - thia - [1] - aza-[4]-cycloheptadiene-[2:6] of the formula

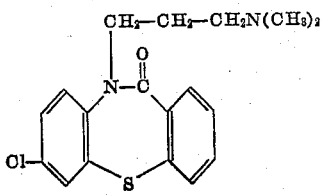

in the form of colorless crystals melting at 113–115° C. The hydrochloride prepared in ethyl acetate by the addition of the calculated quantity of alcoholic hydrochloric acid is a colorless crystalline powder melting at 182–184° C.

*Example J*

If instead of 8-chloro-11-oxo-dibenzo-[b:f]-thia-[1]-aza-[4]-cycloheptadiene-[2:6] as in Example F, 6-chloro-11 - oxo - dibenzo - [b:f] - thia - [1] - aza - [4] - cycloheptadiene-[2:6] is used, there is obtained the 6-chloro-10 - (γ - dimethylamino - propyl) - 11 - oxo - dibenzo - [b:f]-thia-[1]-aza-[4]-cycloheptadiene-[2:6] of the formula

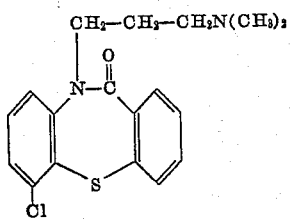

as colorless crystals melting at 108–110° C. (from isopropyl ether). The hydrochloride prepared as described in Example A melts at 123–126° C.

The starting materials for the preparation of the 11-oxo-compounds used as starting materials in Examples A–J can be prepared as follows:

*Example I*

129.5 parts of 2-amino-diphenylsulfide-2′-carboxylic acid methyl ester are heated in a bath having a temperature of 245–250° C. for 40 minutes while distilling off the methyl alcohol formed and for a further 40 minutes under reduced pressure at the same temperature. In this manner the melt becomes solid. After being cooled, the crystalline mass is extracted at the boil with ethanol, disintegrated and filtered with suction in the cold. There is obtained in very good yield 11-oxo-dibenzo-[b:f]-thia-[1]-aza-[4]-cycloheptadiene-[2:6] of the formula

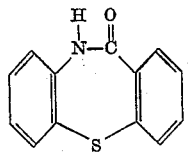

in the form of colorless crystals melting at 257–259° C.

The new compound can be recrystallized from glacial acetic acid or methyl ethyl ketone.

The reaction period can be considerably shortened by increasing the temperature to 280° C. Instead of the methyl ester there may be used another ester, for example, the ethyl or propyl ester.

*Example II*

147 parts of 2-amino-4-chloro-diphenylsulfide-2′-carboxylic acid methyl ester are heated for 30 minutes under atmospheric pressure and for one hour under reduced pressure in an oil bath at 245–250° C. the melt becoming crystalline throughout. After being cooled, the mass is extracted at the boil with 500 parts by volume of ethyl acetate, disintegrated and filtered with suction in the cold. There is obtained in very good yield 8 - chloro - 11 - oxo - dibenzo - [b:f] - thia - [1] - aza - [4]-cycloheptadiene-[2:6] of the formula

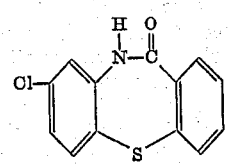

in the form of colorless crystals melting at 294–298° C., which can be recrystallized from dimethyl-formamide.

The 2 - amino-4-chloro-diphenyl sulfide-2′-carboxylic acid methyl ester used as starting material in this example may be prepared, for example, by introducing 2,5-dichloro-nitrobenzene into a boiling solution of sodium thiosalicylic acid methyl ester in methanol in the presence of a copper catalyst, and then reducing the resulting nitro-compound for example, catalytically. It melts at 136–137° C.

*Example III*

24.5 parts of 2-amino-diphenyl-sulfide-2′-carboxylic acid are heated for 30–60 minutes in an oil bath at 150–200° C. The resulting 11-oxo-dibenzo-[b:f]-thia-[1]-aza - [4] - cycloheptadiene-[2:6] melting at 257–259° C. is identical with the compound obtained in Example I.

*Example IV*

If in Example II, 2-amino-5-chloro-diphenyl-sulfide-2′-carboxylic acid methyl ester is used in the place of the 2-amino-4-chloro-compound, there is obtained 7-chloro-11 - oxo - dibenzo - [b:f] - thia - [1] - aza - [4] - cycloheptadiene-[2:6] of the formula

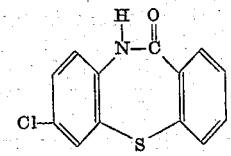

as colorless crystals melting at 316–320° C. (crystallized from dimethyl formamide).

The above starting material can be obtained for example, by reacting 2,4-dichloro-nitrobenzene with a solution of sodium thiosalicylic acid methyl ester in methanol at 40°–65° C. and then reducing catalytically in the presence of Raney nickel the resulting nitro-compound melting at 90–93° C. The 2-amino-5-chloro-diphenyl-sulfide-2′-carboxylic acid methyl ester melts at 144–146° C.

In an analogous manner there is obtained from 2-amino-6-chloro-diphenyl-sulfide-2′-carboxylic acid methyl ester melts at 144–146° C.

In an analogous manner there is obtained from 2-amino-6-chloro-diphenyl-sulfide-2′-carboxylic acid methyl ester melting at 124–126° C. 6-chloro-11-oxo-dibenzo-

[b:f]-thia-[1]-aza-[4]-cycloheptadiene-[2:6] of the formula

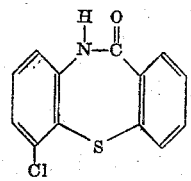

melting at 288–290° C. as a colorless crystalline powder (from dimethyl formamide).

Example 11

To a solution of 5.4 grams of lithium-aluminum hydride in 450 cc. of absolute ether is added at 20–22° C., while stirring vigorously, in the course of one hour the solution of 15 grams of 8-methyl-10-(β-dimethylaminoethyl) - 11-oxo-dibenzo-[b:f]-thia-[1]-aza-[4]-cycloheptadiene-[2:6] in 40 cc. of absolute dioxane, and the mixture is maintained at the boil for a further 5 hours.

The whole is cooled with ice, a small amount of water is added, and the ethereal solution is filtered with suction. After drying the ethereal solution over potassium carbonate, the ether is distilled off and the residue is distilled in a high vacuum. There is obtained 8-methyl-(β-dimethylaminoethyl) - dibenzo-[b:f]-thia-[1]-aza-[4]-cycloheptadiene-[2:6] of the formula

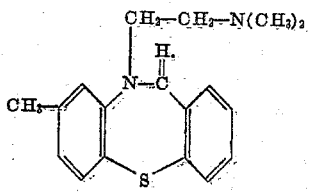

in the form of a pale yellow oil boiling at 152–160° C. under 0.01 mm. pressure. The hydrochloride, prepared in a mixture of alcohol and ethyl acetate, melts at 173–175° C. It contains one molecule of water of crystallization and dissolves well in water. The 8-methyl-10-(β-dimethylaminoethyl) - 11-oxo-dibenzo-[b:f]-thia-[1]-aza-[4]-cycloheptadiene-[2:6] used as starting material can be obtained, for example, by condensing 28 grams of 8 - methyl - 11-oxo-dibenzo-[b:f]-thia-[1]-aza-[4]-cycloheptadiene-[2:6] with 22.4 grams of β-dimethylaminoethyl chloride with the aid of 6.4 grams of sodamide, as described in the copending application, Serial No. 660,742, filed May 22, 1957.

8 - methyl - 11 - oxo-dibenzo-[b:f]-thia-[1]-aza-[4]-cycloheptadiene-[2:6] can be obtained by condensing 112 grams of thiosalicyclic acid methyl ester with 135 grams of 3-nitro-4-chlorotoluene in the presence of 17 grams of sodium in 300 cc. of methanol, reducing the resulting 2-nitro-4-methyl-diphenyl sulfide-2'-carboxylic acid methyl ester with hydrogen in the presence of a nickel catalyst and ring closure of the amino-compound at 240–270° C., as described in the copending application, Serial No. 660,742 filed May 22, 1957.

In an analogous manner the following compounds are prepared:

8-methyl - 10 - (β - diethylaminoethyl)-dibenzo-[b:f]-thia-[1]-aza-[4]-cycloheptadiene-[2:6] from 8 - methyl-10-(β-dimethylaminoethyl) - 11 - oxo-dibenzo-[b:f]-thia-[1]-aza-[4]-cycloheptadiene-[2:6];

8-methyl-10-(β-N-isopropyl - N - methylaminoethyl)-dibenzo-[b:f]-thia-[1]-aza - [4] - cycloheptadiene-[2:6] from 8 - methyl-10-(β-N-isopropyl-N-methylaminoethyl)-11-oxo-dibenzo-[b:f]-thia-[1]-aza-[4] - cycloheptadiene-[2:6];

8-methyl-10-(γ-dimethylaminopropyl) - dibenzo-[b:f]-thia-[1]-aza-[4]-cycloheptadiene - [2:6] from 8-methyl-10-(γ-dimethylaminopropyl)-11-oxo-dibenzo-[b:f] - thia-[1]-aza-[4]-cycloheptadiene-[2:6];

7-methyl-10-(β-dimethylaminoethyl) - dibenzo - [b:f]-thia-[1]-aza-[4]-cycloheptadiene - [2:6] from 7-methyl-10 - (β - dimethylaminoethyl)-11-oxo-dibenzo-[b:f]-thia-[1]-aza-[4]-cycloheptadiene-[2:6];

6-methyl-10-(β-dimethylaminoethyl) - dibenzo - [b:f]-thia-[1]-aza-[4]-cycloheptadiene - [2:6] from 6-methyl-10-(β-dimethylaminoethyl)-11-oxo-dibenzo - [b:f] - thia-[1]-aza-[4]-cycloheptadiene-[2:5];

7:8 - dimethyl - 10 - (β - dimethylaminoethyl)-dibenzo-[b:f]-thia-[1]-aza-[4]-cycloheptadiene-[2:6] from 7:8-dimethyl - 10 - (β - dimethylaminoethyl)-11-oxo-dibenzo-[b:f]-thia-[1]-aza-[4]-cycloheptadiene-[2:6];

8 - methoxy-10-(β-dimethylaminoethyl)-dibenzo-[b:f]-thia-[1]-aza-[4]-cycloheptadiene-[2:6] from 8-methoxy-10-(β-dimethylaminoethyl)-11-oxo-dibenzo - [b:f] - thia-[1]-aza-[4]-cycloheptadiene-[2:6];

8-methoxy-10-(β-diethylaminoethyl) - dibenzo - [b:f]-thia-[1]-aza-[4]-cycloheptadiene-[2:6] from 8-methoxy-10-(β-diethylaminoethyl) - 11 - oxo - dibenzo-[b:f]-thia-[1]-aza-[4]-cycloheptadiene-[2:6];

8 - methoxy - 10 - (γ - dimethylaminopropyl)-dibenzo-[b:f]-thia-[1]-aza-[4] - cycloheptadiene - [2:6] from 8-methoxy-10-(γ-dimethylaminopropyl) - 11 - oxo-dibenzo-[b:f]-thia-[1]-aza-[4]-cycloheptadiene-[2:6].

The starting materials can be obtained by the process described in the copending application Serial No. 660,742 filed concurrently herewith.

What is claimed is:

1. A member of the group consisting of cycloheptadiene compounds of the general formula

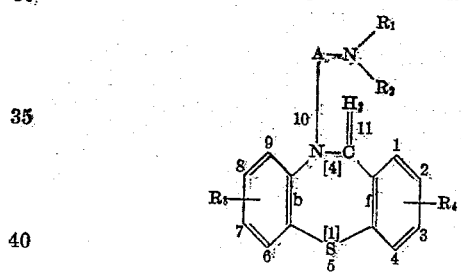

wherein A stands for a lower alkylene radical, $R_1$ and $R_2$ represent members selected from the group consisting of lower alkyl and, when taken together, morpholino and lower alkylene radicals containing 4 to 5 carbon atoms, and $R_3$ and $R_4$ represent, interchangeably, a member of the group consisting of hydrogen, halogen, amino, lower alkyl and lower alkoxy substituents, and therapeutically useful acid addition salts and therapeutically useful lower alkyl quaternary ammonium halide salts thereof wherein the nitrogen atom carrying the $R_1$ and $R_2$ substituents is quaternized.

2. 10 - (β - dimethylamino - ethyl) - dibenzo - [b:f]-thia - [1] - aza - [4] - cycloheptadiene - [2:6] of the formula

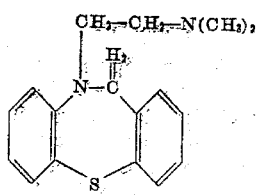

3. 10 - (β - diethylamino - ethyl) - dibenzo - [b:f]-thia - [1] - aza - [4] - cycloheptadiene - [2:6] of the formula

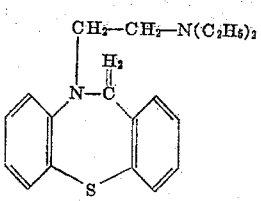

4. 10 - (β - dimethylamino - β - methyl - ethyl) - dibenzo - [b:f] - thia - [1] - aza - [4] - cycloheptadiene-[2:6] of the formula
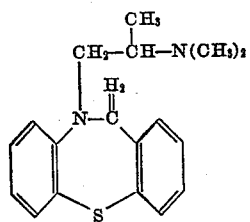
5. 7 - chloro - 10 - (γ - dimethylamino - propyl) - dibenzo - [b:f] - thia - [1] - aza - [4] - cycloheptadiene-[2:6] of the formula
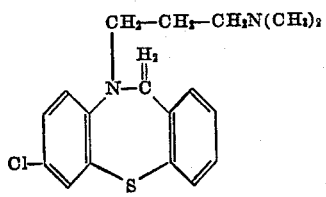
6. 8 - methyl - (β - dimethylaminoethyl) - dibenzo-[b:f] - thia - [1] - aza - [4] - cycloheptadiene - [2:6] of the formula
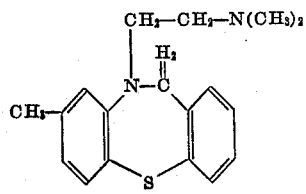
No references cited.

UNITED STATES PATENT OFFICE
CERTIFICATE OF CORRECTION

Patent No. 2,852,528 September 16, 1958

Karl Hoffmann et al.

It is hereby certified that error appears in the printed specification of the above numbered patent requiring correction and that the said Letters Patent should read as corrected below.

Column 8, line 31, for "111-137° C." read -- 111-113° C. --.

Signed and sealed this 23rd day of December 1958.

(SEAL)
Attest:

KARL H. AXLINE
Attesting Officer

ROBERT C. WATSON
Commissioner of Patents